(12) United States Patent
Chau et al.

(10) Patent No.: US 11,627,224 B1
(45) Date of Patent: *Apr. 11, 2023

(54) QUEUE MANAGEMENT OF COLLABORATIVE VIRTUAL WAITING ROOMS

(71) Applicant: Zoom Video Communications, Inc., San Jose, CA (US)

(72) Inventors: Vi Dinh Chau, Seattle, WA (US); Jin Li, Los Gatos, CA (US); Xu Hua Li, San Jose, CA (US)

(73) Assignee: Zoom Video Communications, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/886,697

(22) Filed: Aug. 12, 2022

Related U.S. Application Data

(63) Continuation of application No. 17/588,826, filed on Jan. 31, 2022, now Pat. No. 11,451,667.

(51) Int. Cl.
*H04M 3/42* (2006.01)
*H04M 3/51* (2006.01)
*H04L 65/1093* (2022.01)
*H04L 65/1096* (2022.01)
*H04L 65/403* (2022.01)

(52) U.S. Cl.
CPC ...... *H04M 3/5183* (2013.01); *H04L 65/1093* (2013.01); *H04L 65/1096* (2013.01); *H04L 65/403* (2013.01)

(58) Field of Classification Search
CPC . H04M 3/5183; H04L 65/1096; H04L 65/403
USPC ....... 379/265.01–265.14, 266.01–266.1, 309
See application file for complete search history.

(56) References Cited

U.S. PATENT DOCUMENTS

| | | | |
|---|---|---|---|
| 6,915,336 B1 | 7/2005 | Hankejh et al. | |
| 8,194,841 B2 | 6/2012 | Archambault et al. | |
| 8,463,939 B1* | 6/2013 | Galvin | H04L 65/1096 379/265.01 |
| 10,200,536 B2 | 2/2019 | Klein et al. | |
| 10,547,653 B2* | 1/2020 | Rosenberg | G06F 3/1454 |
| 2002/0073208 A1 | 6/2002 | Wilcock et al. | |

(Continued)

OTHER PUBLICATIONS

G2, Virtual Waiting Room Software, https://www.g2.com/categories/virtual-waiting-room, Jan. 2022, 6 pages.

(Continued)

*Primary Examiner* — William J Deane, Jr.
(74) *Attorney, Agent, or Firm* — Young Basile Hanlon & MacFarlane, P.C.

(57) ABSTRACT

A request for a contact center agent interaction is received from a user device associated with a first user. The user device is connected to a virtual waiting room that includes waiting users of a contact center queue. The waiting users include a second user. from the second user A favorable indication of the first user is received from the second user. A position of the first user in the contact center queue is modified based on the favorable indication. Responsive to an indication to activate a private session between the user device and an agent device associated with a contact center agent, the first user is removed from the virtual waiting room.

20 Claims, 9 Drawing Sheets

(56) References Cited

U.S. PATENT DOCUMENTS

| | | | |
|---|---|---|---|
| 2014/0222907 | A1 | 8/2014 | Seligmann et al. |
| 2016/0132847 | A1* | 5/2016 | Sarris |
| 2016/0234264 | A1* | 8/2016 | Coffman ............ H04L 65/4053 |
| 2016/0246936 | A1 | 8/2016 | Kahn |
| 2017/0011179 | A1 | 1/2017 | Arshad et al. |
| 2018/0007206 | A1 | 1/2018 | Klein et al. |
| 2020/0086197 | A1 | 3/2020 | Kim |
| 2020/0115127 | A1 | 4/2020 | Hebert et al. |
| 2020/0186576 | A1 | 6/2020 | Gopal et al. |
| 2021/0209536 | A1 | 7/2021 | Reuveni et al. |
| 2021/0398668 | A1 | 12/2021 | Chock et al. |
| 2022/0067666 | A1 | 3/2022 | Shiner |
| 2022/0150290 | A1* | 5/2022 | Johnson ................... G09B 7/02 |
| 2022/0368855 | A1* | 11/2022 | McBride ................ G16H 40/20 |

OTHER PUBLICATIONS

AWS Virtual Waiting Room, https://aws.amazon.com/solutions/implementations/aws-virtual-waiting-room/, Nov. 2021, 7 pages.

\* cited by examiner

INFORMATION FOR AGENT — 502

1 – DID YOU RESTART YOUR ROUTER? — 506
 ○ YES
 ○ NO

2 – ARE YOU EXPERIENCING THE SAME PROBLEM ON DIFFERENT DEVICES?
 ○ YES
 ○ NO

3 – WHAT ELSE SHOULD WE KNOW ABOUT THE PROBLEM?

WAITING ROOM — 504

13 OTHERS ARE ALREADY WAITING TO RECEIVE SERVICE. YOU CAN WAIT WITH THEM AND COMMUNICATE WITH THEM IN A WAITING ROOM.

1 – WAITING ROOM OPTION — 508
 ○ YES, I WANT TO WAIT WITH OTHERS
 ○ NO, I DON'T WANT TO WAIT WITH OTHERS — 510

2 – HOW WOULD YOU LIKE TO JOIN? — 512
 ○ IN PUBLIC MODE
   (OTHERS, WHO MAY BE IN PRIVATE MODE, CAN SEE YOU)
 ○ IN PRIVATE MODE (YOU CAN SEE OTHERS, OTHERS CAN'T SEE YOU) — 514

3 – PROVIDE A LABEL/NAME FOR YOURSELF: — 516

QUEUE MANAGEMENT OF COLLABORATIVE VIRTUAL WAITING ROOMS

CROSS REFERENCES TO RELATED APPLICATIONS

This application is a continuation of U.S. patent application Ser. No. 17/588,826, filed Jan. 31, 2022, the entire disclosure of which is incorporated herein by reference.

FIELD

This disclosure relates generally to contact center management and, more specifically, to a collaborative virtual waiting room (VWR).

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 5 is an example of a user interface presented to a user prior to adding the user to a VWR.

DETAILED DESCRIPTION

Figure 1:
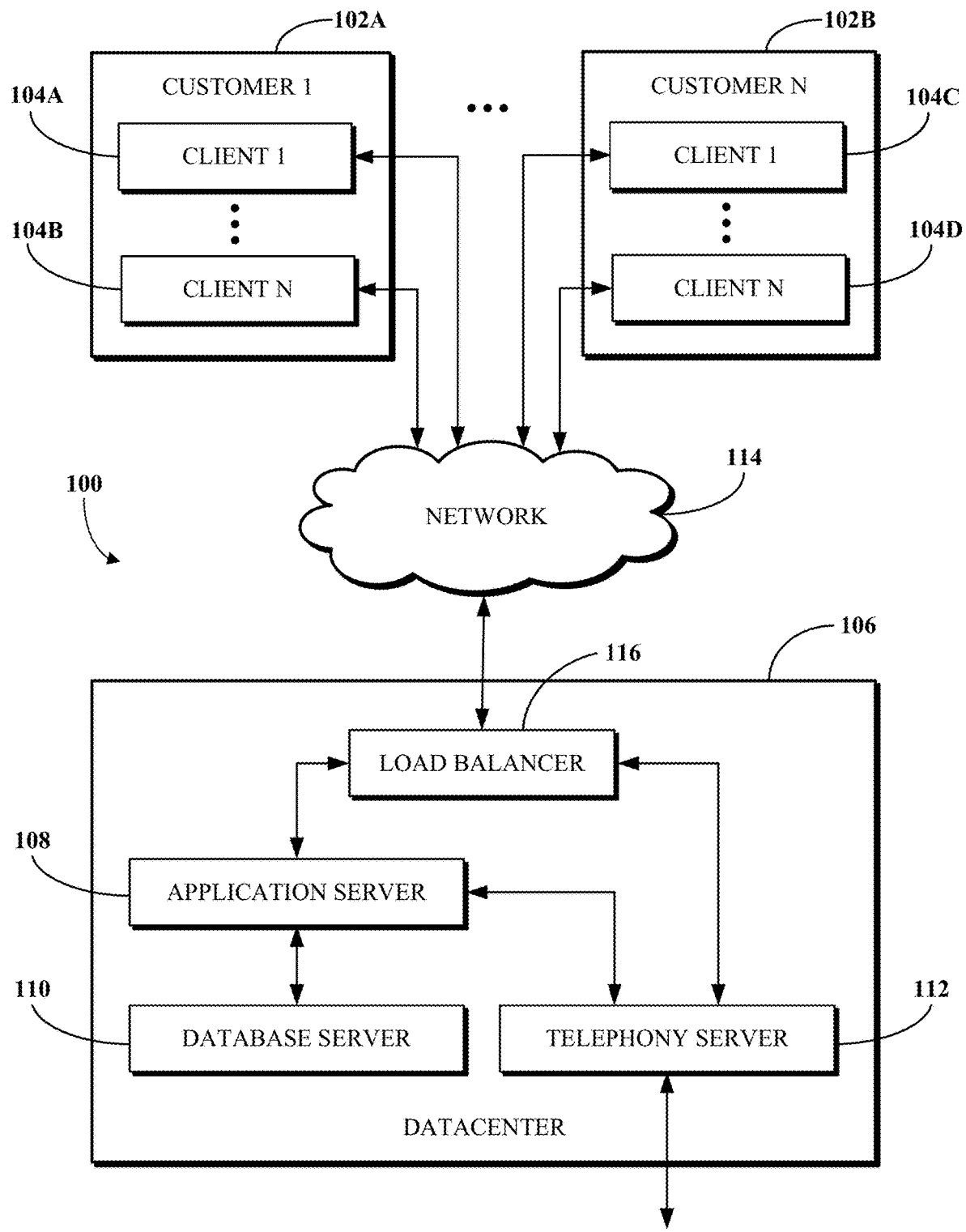
FIG. 1 is a block diagram of an example of an electronic computing and communications system.

A business entity may employ a contact center, such as of a software platform (e.g., a unified communications as a service (UCaaS) platform), to service users (i.e., persons looking to obtain some type of service from an agent of the business entity). Using the contact center, a user may initiate a request for an agent interaction to obtain a service from an agent (e.g., a next available agent) of the business entity. The software platform may offer multiple contact modalities (e.g., telephone calls, chat sessions, or video calls) to provide access to the contact center.

The contact center may include VWR software that implements virtual queues where users wait for a next available agent (e.g., a doctor, a technical support agent, or a product specialist). An agent may also be referred to as a service provider. Waiting users may be ordered, such as in a first-come-first-served basis, on a priority basis, or according to a schedule. When an agent becomes available to service a next waiting user, the user may be placed in a private virtual communications session with the agent so that the agent can provide the service to the user. There are a few conventional approaches to using VWRs.

In a first approach, users may be assigned respective service times (e.g., appointment times). At a respective assigned time, a user may connect to the VWR software to wait for the agent. For example, the agent may be a doctor and the user may be a patient who is assigned a tele-visit appointment time with the doctor. When the agent (e.g., doctor) becomes available, the VWR software can establish (or the agent may cause the VWR software to establish) a private virtual connection with the user to provide the service (e.g., a virtual health assessment). In some situations, the agent may be delayed (e.g., running behind). As such, several users may connect at their respective times and wait. The VWR software may in some cases implement the VWR as no more than a data structure that holds a list of users. When a virtual session is established between a user and an agent, the VWR software may remove the user from the list. As such, while multiple users may be waiting, the users are not aware of each other and, at least from the users' perspectives, each user waits alone in a respective waiting room. Each user can be thought of as waiting in a private room for the agent.

In a second model, at any point in time, there could be many users waiting for service. For example, users may engage a contact center, such as to obtain answers to questions, register complaints, obtain resolutions to issues, and the like. Algorithms of the contact center may route the users to different queues, such as based on known or preliminary information obtained from the users. While waiting in queues, the users may be notified of their respective orders (positions) in the queues and/or their respective estimated wait times. However, and similar to the first model, the users are not aware of each other and, at least from the users' perspectives, each user waits alone in a respective waiting room.

As such, conventional contact center software is limited in that they do not allow waiting users to interact with each other. That waiting users cannot interact with each other can result in increased use of computational resources at the business entity side and for each of the waiting users. More compute power may be necessary at the business entity side to maintain and manage increasing numbers of waiting users, which may result in degraded performance of the contact center software and may cause some operations to fail due to resource exhaustion. Additionally, the longer a user waits in a virtual queue, the more compute (e.g., network) and power resources are required to maintain connections between user devices and the contact center software.

The possibility for degraded performance may also include or require substantially increased investment in processing, memory, and storage resources and may also result in increased energy expenditures (needed to operate those increased processing, memory, and storage resources, and for network transmissions) and associated emissions that may result from the generation of that energy.

Furthermore, conventional contact center software may present a frustrating user experience user where waiting users my feel alone and isolated and where waiting time may feel longer than it actually is due to the lack of interaction with others. Additionally, a waiting user may needlessly wait for an agent when other waiting users may be able to resolve the user's issue. As such, the lack of interaction between waiting users may lead to longer queues, longer wait times, and more agents to service more waiting users.

Implementations of this disclosure address problems such as these by placing users waiting to obtain respective services in a collaborative VWR that is configured to enable the waiting users to interact (e.g., communicate) with one another. Enabling waiting users to interact with one another may allow those users to obtain information from each other, which may lead to a reduction in the number of waiting users. The implementations of this disclosure thus not only improve upon the VWR process, but address agent wait time and related issues common to contact center users.

In response to a request received from a user device associated with a user to establish a connection with an agent (i.e., a "contact center agent interaction"), a VWR software connects the user device to a collaborative VWR (for brevity, a "VWR") that includes other waiting users so that the user may interact with at least a subset of the other waiting users. The request, which may be initiated using a software platform such as the one described with respect to FIG. 4, can be to establish a private virtual connection (e.g., an interaction) with an agent available through the software platform (e.g., as an agent of a contact center implemented in connection with the software platform). When an agent becomes available to service the user, the user may be removed from the VWR and a virtual private session between the agent and the user is enabled. A VWR, as used herein, is a virtual space where users who are virtually waiting to obtain a service from an agent can interact with each other. The waiting users can interact using any number of modalities including an audio-visual (e.g., video) modality, an audio (e.g., using telephony) modality, a text-based (e.g., chat messages) modality, or a combination thereof.

To describe some implementations in greater detail, reference is first made to examples of hardware and software structures used to implement a collaborative virtual waiting room. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, an SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
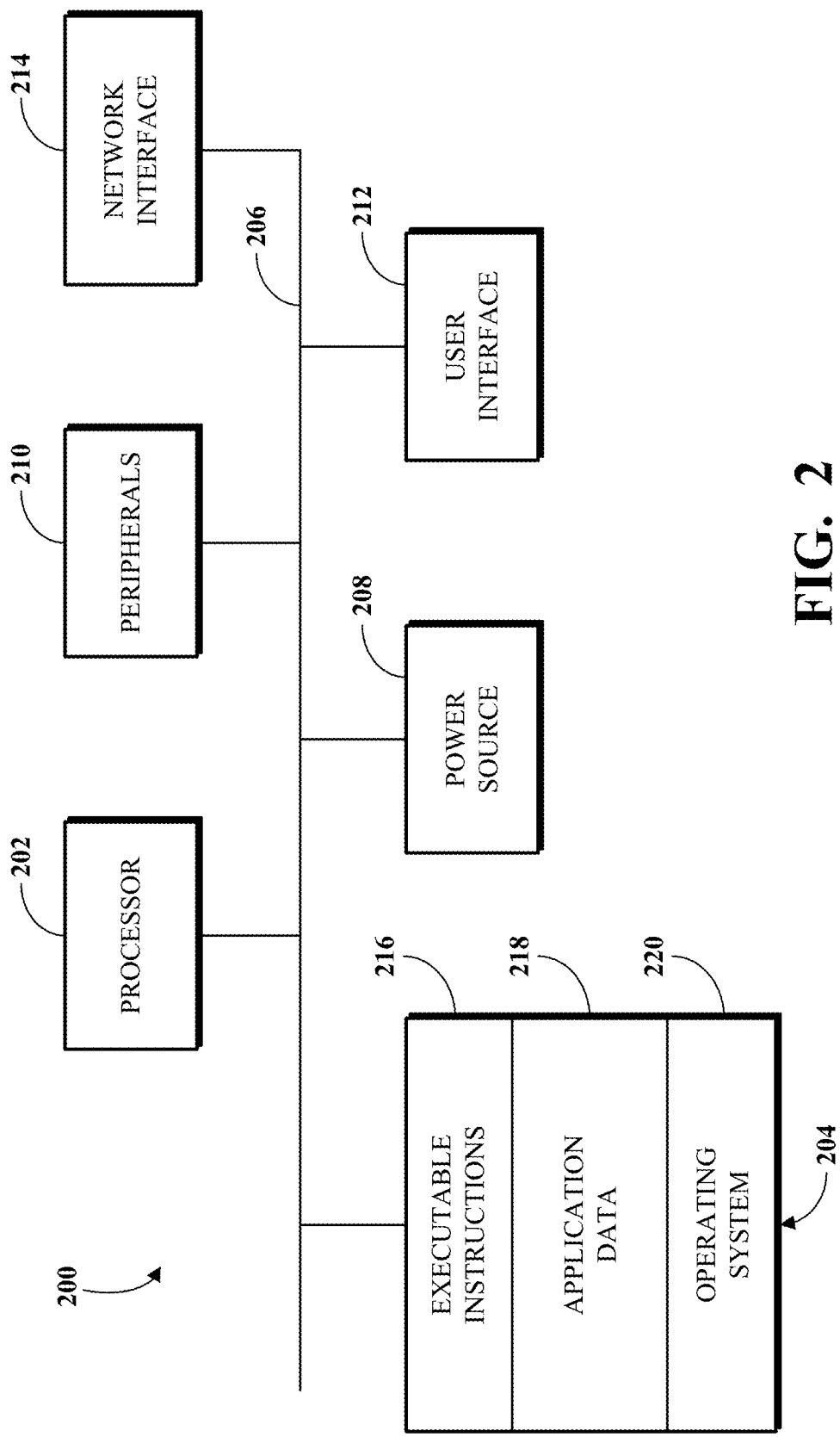
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid-state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
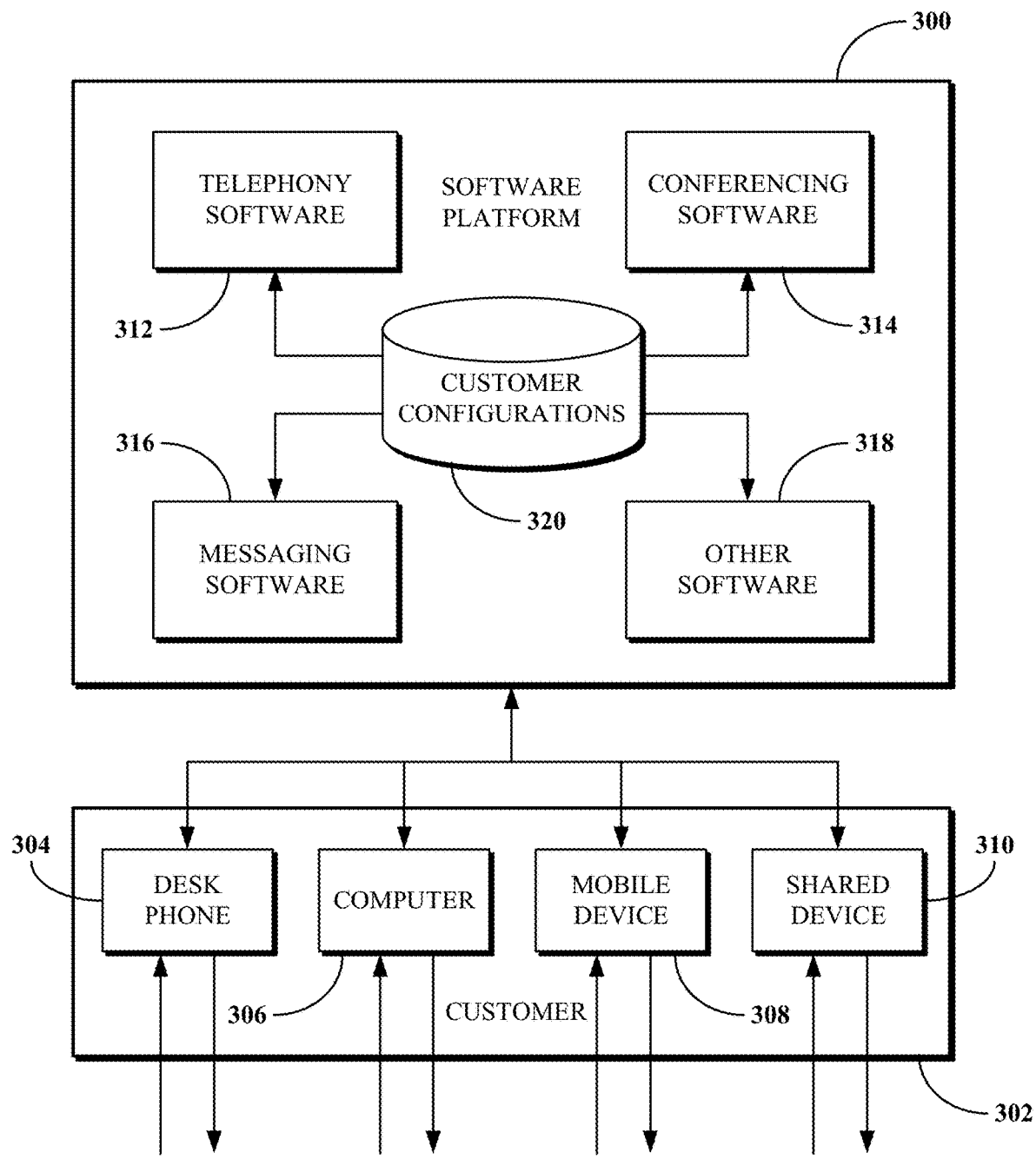
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include a contact center software, a VWR software, or any software that implements or enables a collaborative virtual waiting room for users requesting to receive contact center agent interactions.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
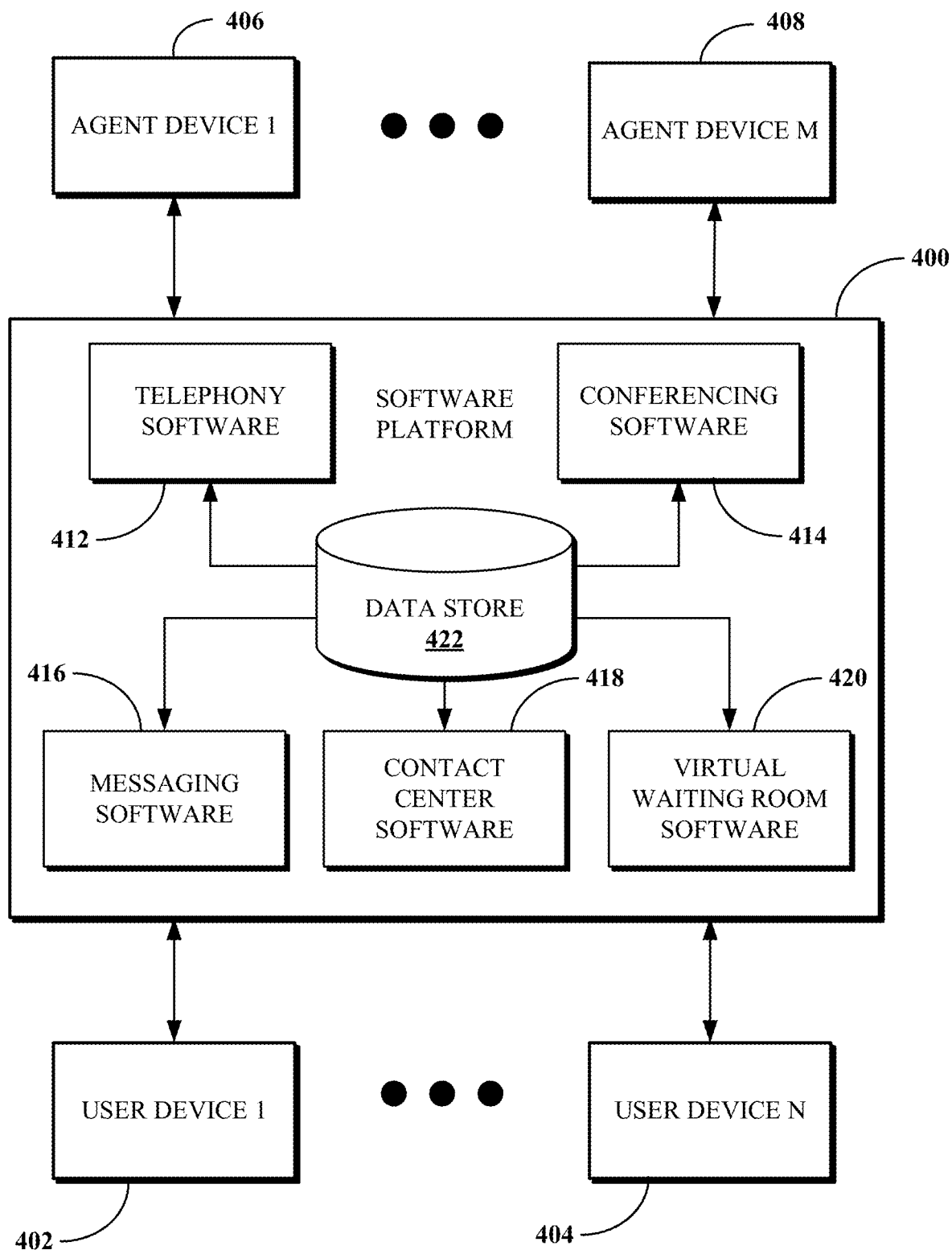
FIG. 4 is a block diagram of an example of a software platform that includes contact center software and implemented by an electronic computing and communications system.

FIG. 4 is a block diagram of an example of a software platform 400 that includes contact center software and is implemented by an electronic computing and communications system, for example, the system 100 shown in FIG. 1. The software platform 400 can be, or can be similar to, the software 300 of FIG. 3. The software platform 400 includes software services accessible using one or more devices, such as user devices 402-404 and agent devices 406-408, which may be client devices or non-client devices. The user devices 402-404 can be used by respective associated users to obtain a service. While not specifically shown, and where the user devices 402-404 and/or the agent devices 406-408 are client devices, the user devices 402-404 can include respective client applications associated with the software platform 400, and/or the agent devices 406-408 can include respective client applications associated with the software platform 400.

It is noted that although two agent devices (406 and 408) are explicitly shown, a contact center software could be provisioned to include practically any number of these devices. Similarly, although two user devices (402 and 404) are explicitly shown, a contact center software could be provisioned to receive requests for service (e.g., requests for contact center agent interactions) from any number of these devices. Thus, the values of N and M as respectively used with the user device 404 and the agent device 408 can each be considered an integer greater than or equal to 2.

As shown, the software services of the software platform 400 includes telephony software 412, conferencing software 414, messaging software 416, contact center software 418, which can be or can be similar to the telephony software 312, the conferencing software 314, and the messaging software 316 of FIG. 3, respectively. The software platform 400 also includes a contact center software 418 and a VWR software 420. The software platform 400 can include fewer or more software. In some implementations, the contact center software 418 can include the VWR software 420.

While not specifically shown in FIG. 4, at least some of the software 412 through 420 may communicate with each other. For example, the VWR software 420 can use services of at least one of the telephony software 412, conferencing software 414, or messaging software 416 to implement the technical features of the VWR described herein; and the contact center software 418 can issue requests to the VWR software 420 to instantiate VWRs, to associate VWRs with queues or agents, to add users to the waiting users of VWRs, to remove a user from a VWR (such as when an agent becomes available for a private session with the user), and so on.

Some or all of the software 412 through 420 uses a data store 422. The data store 422 can include data similar to the data described with respect to customer configurations 320 of FIG. 3. As such, the data store 422 can include data specific to a customer (not shown). The customer can include the agent devices 406-408. Stated another way, the agent devices 406-408 may be owned, operated, or controlled by the customer. Alternatively, the agent devices 406-408 can be operated in connection with the software platform 400 under the direction of the customer (e.g., without the agent devices 406-408 being operated or controlled by the customer). In some examples, at least some of the user devices 402-404 may be owned, operated, or controlled by the customer. The contact center software 418 communicates (e.g., via one or more communications networks) with user devices 402-404, which can include desk phones, computers, mobile devices, and shared devices, which may respectively be, for example, the clients 304 through 310 shown in FIG. 3. The contact center software 418 may enable users to interact with the contact center software 418 using a variety of communication modalities, for example, voice, video, short message service (SMS) text, chat, social media, and email.

The data store 422 may be configured to store data for user interactions. The data store 422 may store data for past user interactions, which are user interactions that have ended as of a given time. In some implementations, the data store 422 may also store data for current user interactions, which are user interactions that are ongoing as of a given time. For example, the data of a past user interaction may include a duration of the past user interaction. In another example, such as in addition to or instead of the preceding example, the data of a current user interaction may include a duration of the current user interaction.

In some implementations, the data of a user interaction includes identifying data (e.g., a telephone number, an email address, or an IP address) associated with the user interaction, which may be used (e.g., by the contact center software 418) to correlate multiple user interactions with a same user. The identifying data can be used to connect a user with an agent. Connecting a user to an agent includes connecting a user device associated with the user to an agent device associated with the agent. The connection may be a peer-to-peer direct connection between the user device and the agent device. The connection may be through the software platform 400. That is, the software platform 400 (e.g., a software therein) may receive data from the user device and the agent device and then transmit that data to the other of the agent device and the user device.

The contact center software 418 can manage user interactions related to obtaining a service via the software platform 400. To obtain a service, a user may transmit, via a user device (e.g., one of the user devices 402 or 404) associated with the user, a request to the software platform 400. The request for service can be handled by (e.g., routed to, received by, or transmitted to) the contact center software 418. For example, one or more of the telephony software 412, the software 414, the messaging software 416, or some other software of the software platform 400 may be configured to treat incoming requests as requests to be handled by the contact center software 418.

To illustrate, the telephony software 412 may be configured such that a call received on a particular telephone number is to be handled by the contact center software 418; the software 414 may be configured such that video calls received through particular web pages or particular Uniform Resource Locators (URLs) are to be handled by the contact center software 418; or the messaging software 416 may be configured such that chat messages received through particular chat channels are to be handled by the contact center software 418.

In some implementations, the contact center software 418 may be configured to automatically conduct user interactions. For example, the contact center software 418 may be configured to use Interactive Voice Response (IVR) software to conduct a user interaction in a voice modality (e.g., for a user of the desk telephone). In another example, such as in addition to or instead of the preceding example, the contact center software 418 may be configured to use chat bot software to conduct a user interaction in a chat modality (e.g., for a user of the desk telephone).

The contact center software 418 may be configured to correlate one or more past user interactions with the contact center software 418 to a current user interaction with the contact center software 418. For example, the past user interaction and the current user interaction may use different modalities for communication (e.g., voice, video, or chat). In an example, the past user interaction may be a chat session, and the current user interaction may be a phone call. The contact center software 418 may be configured to aggregate data of the past user interaction with data of the current user interaction to obtain aggregated interaction data. For example, aggregating the data of the past user interaction with the data of the current user interaction may include determining an aggregated duration based on a duration of the past user interaction and a duration of the current user interaction (e.g., as a weighted sum). The contact center software 418 may be configured to prioritize, based on the aggregated interaction data, the current user interaction in one or more queues of user interactions in the contact center software 418 (e.g., a queue for waiting for an agent of the contact center software 418). The contact center software 418 may be configured to generate a message based on the aggregated interaction data. For example, the message may include prompts for assisting an agent of the contact center software 418 to complete the current user interaction.

The contact center software 418 may be configured to route some user interactions to an agent device, such as the agent device 406 or the agent device 408 for handling by a human agent. Similarly, a request from a user can be a request that is to be specifically handled by a human agent. In either case, a user request that is ultimately to be handled by a human agent is referred to herein as "a request for contact center agent interaction." The contact center software 418 can establish a virtual session between the user and an available agent. More specifically, the contact center software 418 can establish a virtual session between the user device and the agent device so that the user and the agent can virtually interact, such as using a chat session, a video session, a voice session, or some other modality that depends on or is the modality that the user used to connect with the contact center software 418.

In some situations, one or more agents may not be immediately available (e.g., at the time that a request for contact center agent interaction is received) to provide services. As such, the contact center software 418 can place waiting users in a queue until a next agent is available. As agents become available, the contact center software 418 removes users from the queue and connects the users to the available agents. Adding a user to the queue can include adding the user device to the queue. Adding the user device to the queue can include adding an identifier of the user device, such as an IP address, a phone number, or any other identifier that uniquely identifies the user device, to the queue.

In some situations, the user device may disconnect from the contact center software 418 while the user is waiting in the VWR, such as due to an intermittent network outage, a power outage, or the like. The contact center software 418 can use the identifier of the user device to re-add the user device to the queue at a new position that is based on the previous position of the user device in the queue. That is, re-adding the user device to the queue may include preserving the previous position of the user device in the queue. In an example, the user device is re-added if the contact center software 418 receives a request for a contact center agent interaction from the user device within a threshold period of time from a previous contact center agent interaction (or request). Whether the user device is reconnecting within the threshold period of time can be determined using the data of the user interaction obtained from the data store 422.

The new position may be the same ordinal position as the previous position (e.g., $13^{th}$ position). The new position can be based on a relative previous position in relation to other user devices. To illustrate, before disconnecting, the user device may have been positioned in the queue immediately ahead of a first user device and immediately following a second user device. When re-adding the user device to the queue, the user device may be placed immediately ahead of the first user device or placed immediately following the second user device.

In an example, the user may be re-connecting using another user device. The contact center software 418 can determine whether the other user device is associated with the user based on the data of user interaction, as described above. If the other user device is correlated with the user, then the other user device is re-added to the queue.

As mentioned, the queue may generally be a first-come-first-served queue, which may also be referred to as first-in-first-out (FIFO) queue. In some situations, the contact center software 418 may not add users to a queue in the order that the respective requests for contact center agent interactions are received from user devices associated with the users. Some users may have higher priority as compared to other users and the users are added to the queue according to their associated priorities. User priorities may be determined based on user interaction data stored in the data store 422. In another example, respective priorities may be associated with users in the data store 422.

Connecting a user to an agent includes establishing a private session between the user and an agent. More specifically, connecting a user to an agent includes establishing a virtual private session between the user device and the agent device. The session is private in that the session, at least to start, only includes the user device and the agent device. It is noted that others may be joined to the private session by one or both of the user or the agent. The contact center software 418 can be used to transmit connection information for joining the private session to a third-party. To illustrate, after establishing a private session between a specialist and a patient, a primary care physician of the patient may be invited to join the private session. As another illustration, the agent may determine that a supervisor is required to resolve a request of a customer, as such the supervisor may be joined to the private session.

The contact center software 418 may be configured to add waiting users to a VWR where at least some of the waiting users can interact (e.g., collaborate, interact) while waiting for an agent to become available. The contact center software 418 may instantiate (e.g., associate or create) a VWR when it is determined, in response to receiving a request for contact center agent interaction from a user device, that the user is to wait and there are no other waiting users. In another example, the contact center software 418 can associate a VWR with a queue of users, whether or not there are currently waiting users. Either way, the contact center software 418 can associate a VWR with one or more queues of users.

A queue may be associated with an agent or a topic. To illustrate, a business entity may be a medical facility where multiple doctors (i.e., agents) can perform tele-visits with patients. As such, the VWR can be configured to associate respective VWRs with one or more of the doctors. For example, a respective VWR can be associated with the queue for a doctor; a same VWR may be associated with the queues of two or more doctors; and so on. As such, a VWR may be associated with one or more agents. In another illustration, requests for contact center agent interactions may be topic-, subject-, product-, issue-, department-, or the like, based (collectively, topic-based). The contact center software 418 may be configured to associate a VWR with one or more topics. For example, respective VWRs may be associated with "Product XYZ," "Internet Outage," "Accident Reporting," "Questions about Medical Coverage," "Sales Representative," or the like.

To reiterate, the contact center software 418 can connect a user device to a VWR. The VWR may include a set of waiting users (i.e., user devices associated with the waiting users) in a queue (i.e., a contact center queue). The VWR can be configured to enable the first user to virtually interact with at least a subset of the waiting users.

In some implementations, the contact center software 418 or other software of the software platform 400 can include a workflow editor tool usable to configure user experience workflows through a contact center interaction. For example, the workflow editor tool may be a visual editor tool for enabling workflow designers to configure user experience workflows based on input received for various object types selectively arranged within the user experience workflows. Generally, a user experience workflow represents one or more sequences of operations which are performed to move a contact center user through a contact center interaction starting from the request being received from the user device of the user and ending with the user device being connected to a private session with an agent device. The user traverses a user experience workflow as it is configured to interact with objects along one or more paths thereof. Examples of those objects include, but are not limited to, queue objects, VWRs and prompts therefor, menu objects, input objects, forwarding objects, media playback objects, condition objects, and messaging objects. The user experience workflow can be bound to a contact center entry point (e.g., a telephone number or SIP URL used to access the contact center) to cause users who access the contact center therefrom to go through the workflow.

The workflow editor tool can be used to associate a VWR with a queue or a contact center interaction. Stated another way, a queue or a contact center interaction can be configured using the workflow editor tool to include the VWR. The workflow editor tool can be used to configure options of the VWR.

For example, the workflow editor tool can be used to configure the VWR software 420 to add users to the VWR in public mode (described below) only. In another example, the workflow editor tool can be used to configure prompts (such as described with respect to FIG. 5) and rules for using responses to the prompts received from users. The workflow editor tool can be used to configure actions available to the users via user interfaces of the VWR, such as at least some of the actions described with respect to FIG. 6 (such as action 610-614). For example, one VWR may be configured to enable, amongst other options, private chats and favorable indications while another VWR may be configured to only enable private chats. The workflow editor tool can also be used to configure whether both, none, or one of the position of the user in the queue or the expected wait until a private session between the user and a contact center agent can be started are to be displayed to the user. The workflow editor tool can be used to configure whether a user can request additional time in the queue, as described with respect to FIG. 7.

FIG. 5 is an example of a user interface 500 presented to a user prior to adding the user to a VWR. A contact center software, such as the contact center software 418 of FIG. 4, can present or cause the user interface 500 to be presented on a user device of the user in response to a request from the user device for a contact center agent interaction received. A client application associated with the software platform 400 and executing on the user device may display the user interface 500 on the user device. While the user interface 500, as shown, may be more appropriate for a wide screen display, other layouts and interaction paradigms are possible for different form factors and modalities. The user interface 500, as shown, includes a section 502 and a section 504.

The section 502 can be used to collect information from the user. The information from the user may be used by the contact center software to determine a queue (or equivalently, one or more agents) that the request should be routed to. That is, the information from the user may be used to identify an available contact center agent to whom the user device is to be connected in a private session. The information obtained from the user may be information that the agent can use to provide the service to the user. The contact center software can additionally, or alternatively, use aggregated interaction data to identify the user or a queue to route the user to.

The section 504 can be used to obtain VWR connection information from the user. The contact center software can use the VWR connection information to determine whether to add the user to the waiting users of the VWR and a waiting mode for adding the user to the VWR. For example, a prompt 508 asks the user whether the user wants to be added to the VWR. Where the response to the prompt 508 is in the affirmative, the prompt 510 asks the user whether the user should be added to the VWR in a public mode (e.g., an option 512) or in a private mode (e.g., an option 514). If the user selects a choice (e.g., "YES, I WANT TO WAIT WITH OTHERS" as shown in the prompt 508) indicating that the user is to be added to the VWR, then additional prompts (e.g., prompt 510 and prompt 516) may become available so that the user can provide additional information. The user is added to the VWR (i.e., the user device is connected to the VWR). If the user selects a choice (e.g., "NO, I DON'T WANT TO WAIT WITH OTHERS") indicating that the user is not to be added to the VWR, then the additional prompts may not become available in the user interface 500 and the contact center software does not add the user to the VWR. That is, the contact center software does not add the user to the list of waiting users in the VWR. While waiting in the VWR, the contact center software allows the user to change the waiting mode. In some implementations, the user may automatically be entered into the VWR. In such a case, the prompt 508 may be omitted and the process may begin with the prompt 510.

Figure 6:
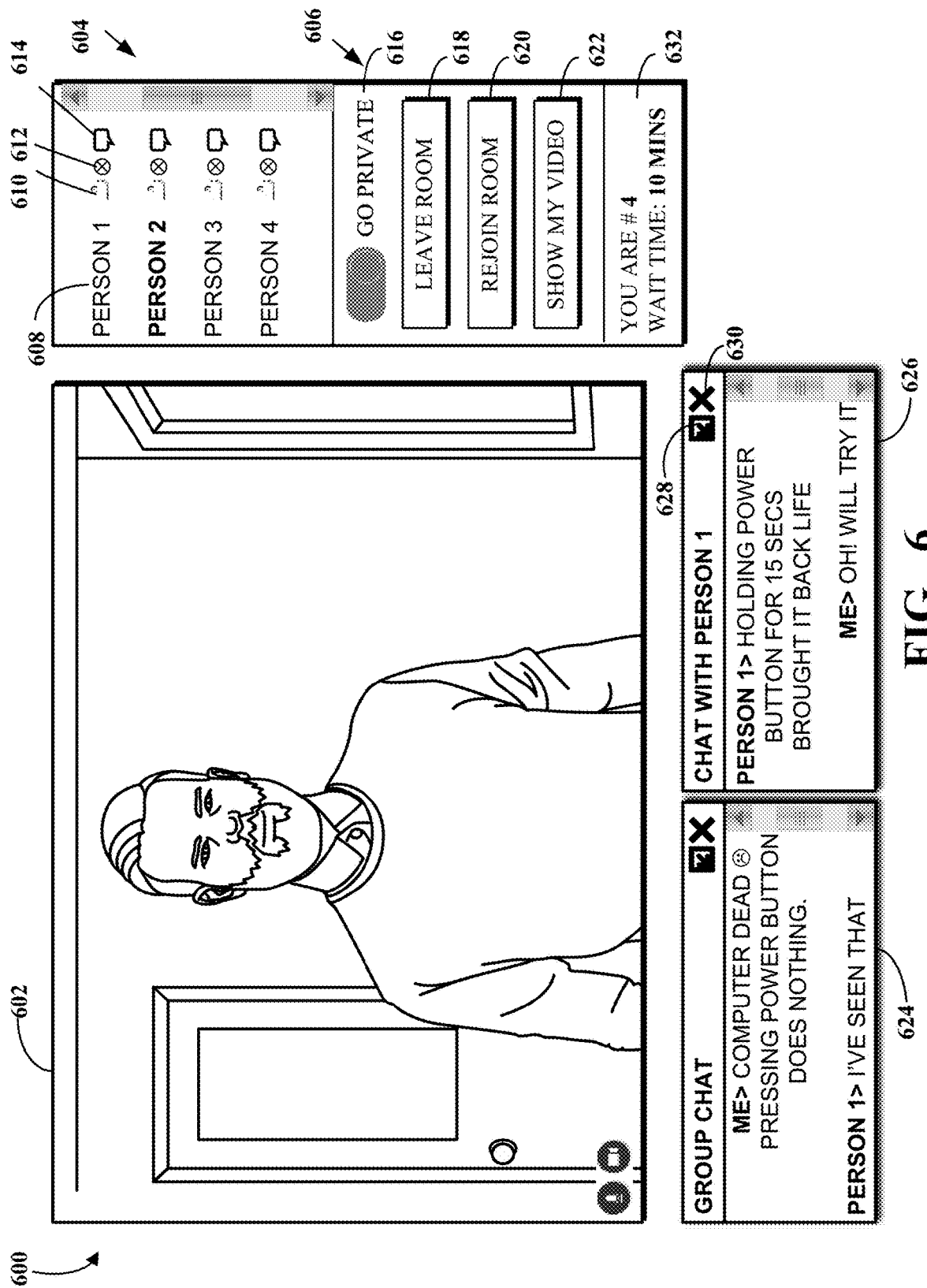
FIG. 6 is an example of a user interface that includes a VWR.

The public mode, corresponding to the option 512, can include one or more of making the presence of the user in the VWR known to the other waiting users; enabling the user to observe (e.g., read, listen to, or view) communications between other waiting users; enabling the user to interact (e.g., speak to or send messages to) with at least some of the waiting users; enabling the user to block one or more of the waiting users; enabling other waiting users, who are not blocked by the user, to interact with the user; or a combination thereof. The user can interact with those waiting users who are also public and have not blocked the user. That a user is enabled to perform an action (e.g., to interact with at least some of the waiting users) can include that the user interfaces associated with the VWR software include user controls (which may be presented in user interfaces) or otherwise is responsive to commands that perform the action. The user may provide, such as in response to the prompt 516, an identification label that is used to identify the user to the other waiting users of the VWR, as shown in FIG. 6. If the user does not provide an identification label, the contact center software can use a default label (e.g., "PERSON" as shown in FIG. 6).

The private mode, which corresponds to the option 514, can include one or more of preventing the presence of the user in the VWR from being known to the other waiting users; enabling the user to observe communications between other waiting users; preventing the user from communicating with other waiting users; or a combination thereof. Preventing the user from performing an action can include the VWR omitting user controls or otherwise not responding to commands from the user that would cause an action to be performed.

While the user interface 500 shows one arrangement of questions and controls, the disclosure is not so limited. For example, the section 502 and the section 504 may not be combined in a single user interface. For example, the user may first be prompted to provide information (such as those of the section 502) so that the contact center software can determine an appropriate queue to add the user to. Subsequently, the user may be presented with the section 504 so that the contact center software can determine whether to place the user in a VWR associated with the queue.

Additionally, while FIG. 5 illustrates a graphical user interface that the contact center software may present in connection with particular modalities that are used to request contact center agent interactions, the contact center software may use or present similar user interfaces with other modalities. For example, the user interface 500 may be used with requests for contact center agent interactions that are received via a web browser or with requests for video-based private sessions between users and agents. If a request for contact center agent interaction is received via telephony, then the contact center software may audibly present the same or similar information as those in FIG. 5 and receive verbal responses. If a request for contact center agent interaction is received via a chat interface, then the contact center software may interactively (e.g., one at a time) present the same or similar information as those in FIG. 5 to the user and interactively (e.g., one at a time) receive responses from the user.

FIG. 6 is an example of a user interface 600 that includes a VWR. A contact center software, such as the contact center software 418 of FIG. 4, can present or cause the user interface 600 to be presented on a user device of a user indicating a desire to be added to the VWR, such as by selecting the option 512 of FIG. 5. Aspects of the user interface 600 may be implemented by the contact center software, a VWR software, or a combination thereof. As can be appreciated, data (including requests) received from the user interface 600 may be received by the contact center software and at least partially handled (e.g., used) by the contact center software, received by the contact center software and at least partially transmitted to the VWR software for handling, received and at least partially handled by the VWR software, or received by the VWR software and at least partially transmitted for handling to the contact center software. Other interactions between the VWR software and the contact center software are possible.

A client application associated with the software platform 400 and executing on the user device may display the user interface 600 on the user device. The user interface 600 includes a previewer 602, a waiting users list 604, and an actions list 606. While the user interface 600 is described as being presented to one user, it is to be understood that a similar user interface may be presented to each of the other waiting users. While the user interface 600, as shown, may be more appropriate for a wide screen display, other layouts and interaction paradigms are possible for different form factors and modalities.

In some implementations, the client application may cause the user interface 600 to be displayed on a device associated with the user device, such as via a common user account. For example, where the user device is a telephone, the client application may cause the user interface 600 to be displayed at a tablet or desktop computer also registered for use by or for the user of the telephone according to the user account. This may allow the user to better engage with the VWR and the other users therein where the user device may otherwise limit such engagement.

The user interface 600 illustrates a case where the private session between the user and the contact center agent is to be a video session and, as such, the user interface 600 can include the previewer 602. Communication channels of the user device can be configured in anticipation of the connection with an agent device. The previewer 602 allows the user to see what the agent will see. That is, a camera of the user device can be turned on and images (e.g., an image stream) captured by the camera can be displayed in the previewer 602. Additionally, via the previewer 602, the user can configure (not shown) the audio device(s) to be used to interact with the agent. As mentioned above, the private session can use other modalities. For example, if the private session is a chat session, then the previewer 602 may be chat box. In some implementations, the VWR may not include the previewer 602 and the communication channels of the user device may be initiated and enabled at the time that the private session is initiated. In an example, the user can enable the VWR software to access the images captured by the camera so that the VWR software can display the captured images to the other waiting users.

The waiting users list 604 displays a list of the waiting users. An identifier (such as an identifier 608) can be associated with each waiting user. The identifier can be the dentification label obtained in response to the prompt 516 of FIG. 5, or a default identifier if none was provided. A set of actions (such as the actions 610-614) can be associated with each of the waiting users. More or fewer actions can be available. In response to the user invoking (e.g., clicking on, voicing) the action 610, the user device transmits a favorable indication of the corresponding waiting user (e.g., PERSON 1 in this case) to the VWR software, which may in turn transmit the favorable indication to the contact center software.

In response to the user invoking the action 612, the user device transmits a request to the VWR software to block the corresponding waiting user. Blocking a waiting user can have different semantics. For example, blocking a waiting user can include that messages posted by the waiting user in a group chat (such as shown in a group-chat window 624) are not shown to the user (i.e., not transmitted to the user device by the VWR software), that the waiting user cannot initiate a private chat session with the user, or both. In response to the user invoking the action 614, a private chat session (such as shown in a private-chat window 626) is initiated between the user and the selected user. While not specifically shown, the user can initiate a private chat with more than one of the waiting users.

The actions list 606 includes actions 616-622. However, more of fewer action can be available in the actions list 606. The action 616 is a toggle that enables a user to toggle between the private mode and the public mode. In response to the user invoking the action 618, the contact center software can remove the user from the VWR. Removing a waiting user from the VWR can include one or more of no longer showing the user in the waiting users list 604 of the other waiting users, terminating private chats (if any) between the user and other waiting users, removing the user from the group chat, or no longer showing to the user communications (such as of the group chat) of the other waiting users. In response to the user invoking the action 620, the contact center software can add the user back to the VWR. Additionally, if the user did not choose to be added to the VWR, such as in response to the prompt 508 of FIG. 5, then invoking the action 620 adds the user to the VWR (i.e., connects the user device to the VWR). In response to invoking the action 622, an image or a video of the user captured by the camera of the user device can be shown to the other waiting users. For example, the image or video can be shown as a thumbnail in place of or in addition to the identifier of the user in the waiting users list 604.

The VWR software 420 can maintain a group chat and communicate the content of the group chat to the respective devices of the waiting users. The VWR software 420 transmits messages communicated (e.g., typed or spoken) in the group-chat window 624 by one waiting user and which are to be transmitted for display in the corresponding group-chat windows of the other waiting users. As mentioned, the VWR software 420 does not transmit the messages of a waiting user to those who blocked the waiting user. The VWR software 420 can also maintain private chats (e.g., the private-chat window 626) between waiting users or groups of waiting users. Private chats are explicitly initiated by a waiting user, such as described with respect to an action 614. Each chat window can include a respective control 630 and a respective control 628. When invoked, the control 628 causes the chat window to be minimized. When invoked, the control 630 causes the chat window to be closed.

In an example, an agent may communicate with one or more of the waiting users. For example, the VWR software 420 may allow an agent to post messages to the group-chat window 624. In another example, the VWR software 420 may allow an agent to initiate a private-chat window with the one or more waiting users.

Referring again to the favorable indication described above, one or more waiting users may transmit favorable indications of other waiting users. For example, in the group-chat window or in a private-chat window, one waiting user (i.e., a "favored user") may post a message that causes another waiting user (i.e., a "favoring user") to invoke the action 610. There can be many reasons for favorable indications. To illustrate, the favored user may have provided a technical solution to another waiting user's technical problem; the favored user may have product information that another user found to be useful; the favored user may have communicated that she is in extreme pain and asks to be moved up the queue.

The VWR software 420 may communicate favorable indications to the contact center software 418, which may alter the position of the favored user in the queue based on the favorable indications. The position of the favored user may be altered in any number of ways. In an example, the contact center software 418 may move the favored user up by one position for each favored indication. In another example, the contact center software 418 may move the favored user up by one position in response to receiving a predefined number of favorable indications. The predefined number can be based on the total number of waiting users (e.g., 20% or 50% of the waiting users). The number of positions to move the favored user up by can depend on the total number of favored indications provided to the favored user.

In an example, the user interface 600 can also include a status 632. The status 632 can include the position of the user in the queue, an expected wait until a private session between the user and a contact center agent can be started, or both.

After some time of waiting in the VWR, an agent becomes available and the user is to be connected in a private session with the agent. When the agent becomes available, an indication to activate the private session between the user and a contact center agent can be received at the contact center software. In an example, the indication can be activated in response to a request received from a device associated with an agent. That is, the agent himself or herself can indicate to the contact center software that the agent is ready to service a next user in the queue. In another example, the contact center software may monitor availability of agents and when an agent becomes available, the contact center software indicates that the private session is to be activated. That the contact center software determines that an agent is available can have different semantics, depending, for example, on rules configured in the contact center software. In an example, determining that an agent is available can include that the agent is not currently participating in a private session with another user. In response to the indication, user information may be routed to the agent, the user device may be connected to the agent device, or both. Connecting the user device to the agent device can include enabling the agent device to receive data (e.g., one or more of video, audio, text messages) displayed in the previewer 602 of FIG. 6. Responsive to the indication to activate the private session between the user device and the agent device, the user can be removed from the VWR. The contact center software can issue a request to the VWR software to remove the user from the VWR.

Figure 7:
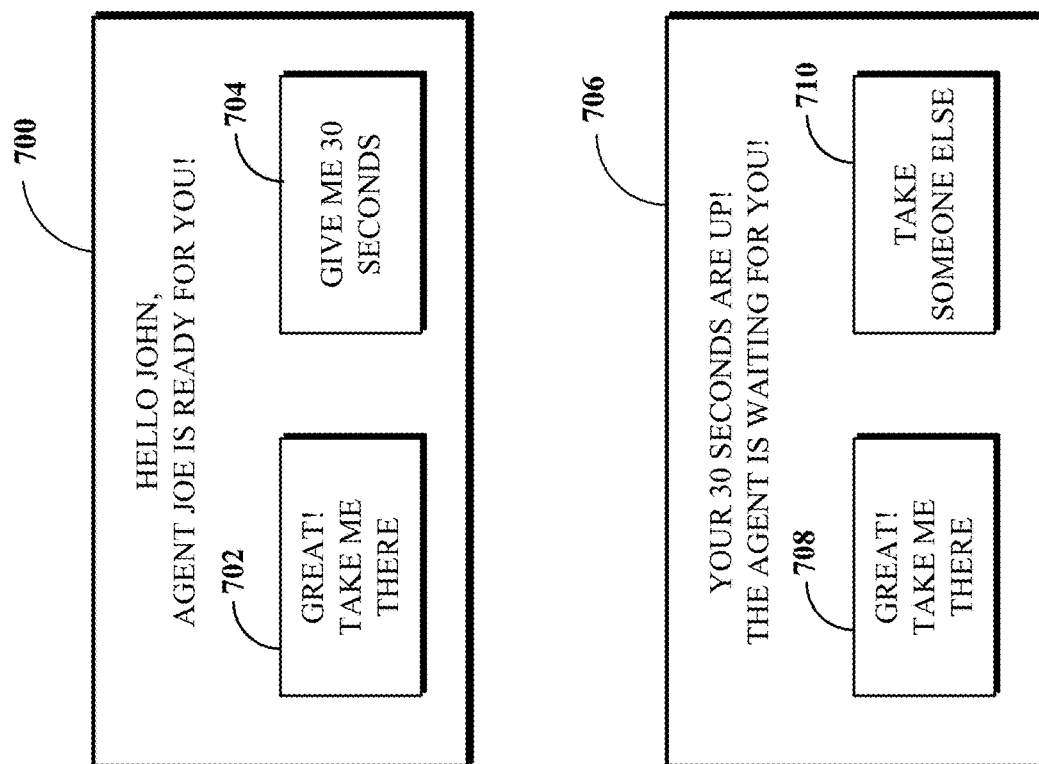
FIG. 7 illustrates examples of user interactions responsive to an agent becoming available for a private session with a user.

In some implementations, the user is not removed from the VWR and the user device is not connected to the agent device when the agent becomes available. FIG. 7 illustrates examples of user interactions responsive to an agent becoming available for a private session with a user. While graphical user interfaces are described with respect to FIG. 7, as can be appreciated such user interfaces may be presented in other modalities, such as text messages or audibly, and receive corresponding user responses using the same modality.

The contact center software may present, or cause to be presented, on a user device a dialog 700 indicating to the user that an agent is available. In response to invoking an action 702, the user is removed from the VWR and the user is connected to the agent. In response to invoking an action 704, connecting the user to the agent can be delayed for a period of time (e.g., 30 seconds or some other preconfigured period of time). There can be many reasons that the user would want to delay connecting to the agent and being removed from the VWR. For example, the user may want to wrap up a private chat. As such, the contact center software can extend the time for connecting the user to the agent by the period of time. In an example, a count-down timer of the period of time may be displayed in the user interface 600 of FIG. 6.

After the period of time expires, a dialog 706 may be presented to the user indicating that the timer has expired. In response to invoking an action 708, the user is removed from the VWR and the user is connected to the agent. In response to the user invoking an action 710, the contact center software can move the user down the queue by a certain number of positions (e.g., 1 position) and the contact center software may connect the agent to another waiting user who is now at the head of the queue.

Figure 8:
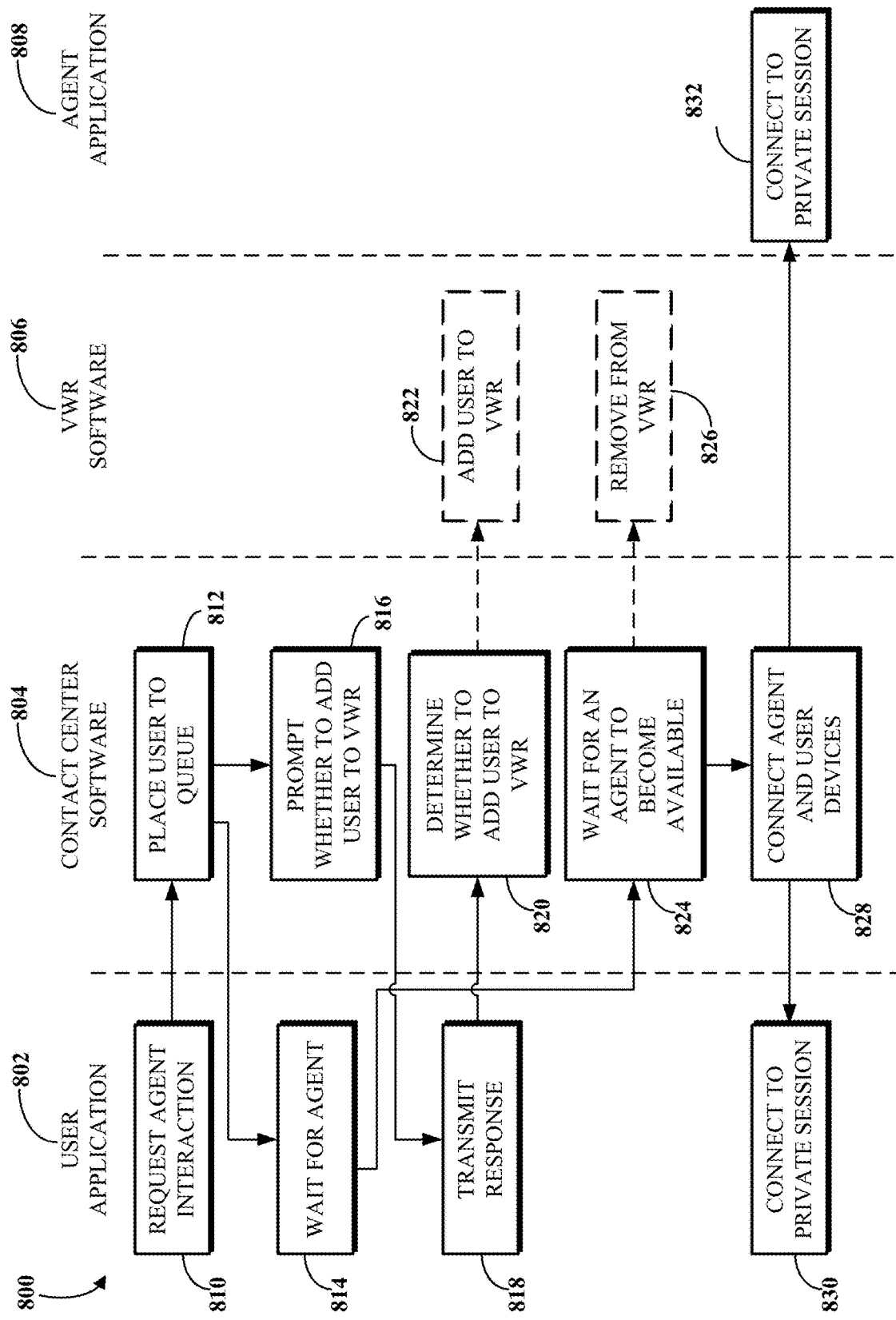
FIG. 8 is an interaction diagram of a contact center agent interaction.

FIG. 8 is an interaction diagram 800 of a contact center agent interaction. The interaction diagram 800 includes a user application 802, a contact center software 804, a VWR software 806, and an agent application 808. The user application 802 can be an application available at or executing in (e.g., at or by) a user device associated with a user, such as one of the user devices 402-404 of FIG. 4. The contact center software 804 can be the contact center software 418 of FIG. 4. The VWR software 806 can be the VWR software 420 of FIG. 4. The agent application 808 can be an application available at or executing in (e.g., at or by) an agent device associated with an agent of a contact center, such as one of the agent devices 406-408 of FIG. 4.

At 810, the user application 802 (or equivalently, the user device) transmits a request to the contact center software 804 for a contact center agent interaction. At 812, the contact center software 804 may place the user in a queue associated with one or more agents that the contact center software 804 determines can service the request. Placing the user in the queue can include transmitting requests for information and receiving information from the user to determine the queue, from amongst many, to place the user in. At 814, the user application 802 waits for an agent to become available at 824. That is, the user application 802 waits until a virtual connection can be made between the user device and an agent device.

At 816, the contact center software 804 transmits one or more prompts to the user application 802. The prompts include whether the user would like to be placed in a virtual waiting room while waiting for an agent. At 818, the user application 802 may present the prompts to the user, obtain answers from the user, and transmit the responses to the contact center software 804. At 820, the contact center software 804 determines whether to add the user to a VWR based on the responses received from the user application 802. If the responses include that the user is to be placed in a VWR, then the contact center software 804 may issue a request to the VWR software 806 to place the user in a VWR associated with the queue. At 822, the VWR software 806 receives the request and adds the user to the queue. It is noted while a certain order of the steps 810-822 is illustrated, other orders are possible. For example, the contact center software 804 may not perform 812 until the responses are received from 818.

At 824, the contact center software 804 waits until an indication to activate a private session between the user device (e.g., the user application 802) and an agent device (e.g., the agent application 808) is received. That is, the contact center software 804 waits until an agent is ready. In response to an agent becoming ready, the contact center software 804 transmits a request to the VWR software 806 to remove the user from the VWR (if the user was added to, or is currently in, the VWR). In some implementations, and as described with respect to FIG. 7, the user may not be immediately removed from the VWR. At 824, the VWR software 806 removes the user from the VWR.

At 828, the contact center software 804 connects the user application 802 to the agent application 808. Connecting the user application 802 to the agent application 808 can include establishing or identifying a private communication session; and transmitting connection details of the communication session to at least one of the user application 802 or the contact center software 804. The communication session may be one that is configured by one of the telephony software 412, the conferencing software 414, or the messaging software 416 of FIG. 4, depending on a modality via which the request for the contact center agent interaction was received at 810. At 830, the user application 802 connects to the private session. At 832, the agent application 808 connects to the private session. As mentioned above, in some situations, the private session may be initiated by the agent application 808. As such, the connection details need only be transmitted to the user application 802.

Figure 9:
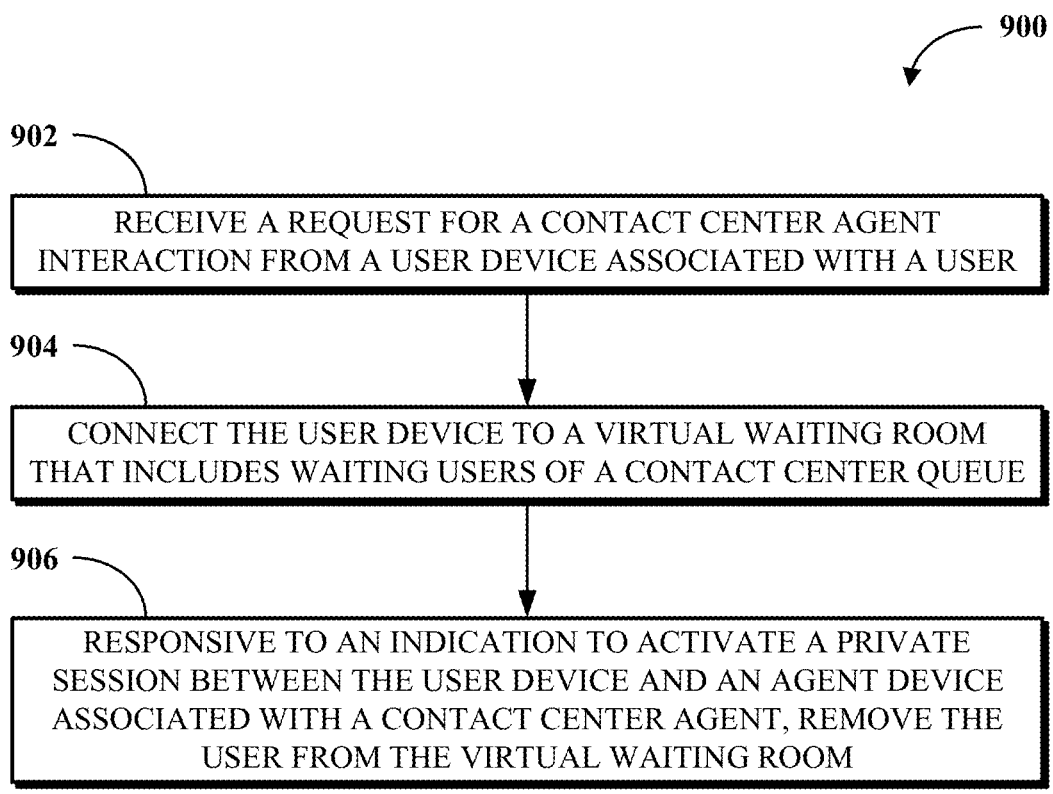
FIG. 9 is a flowchart of an example of a technique for adding a user requesting a contact center agent interaction to a VWR.

To further describe some implementations in greater detail, reference is next made to examples of techniques which may be performed by or using a collaborative virtual waiting room. FIG. 9 is a flowchart of an example of a technique 900 for adding a user requesting a contact center agent interaction to a VWR. The technique 900 can be executed using computing devices, such as the systems, hardware, and software described with respect to FIGS. 1-8. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a request for a contact center agent interaction is received from a user device associated with a user. The user device can be one of the user devices 402-404 of FIG. 4. The request can be received at a software platform, such as the software platform 400 of FIG. 4. More specifically, the request can be received at a contact center software of the software platform.

At 904, the user device is connected to a VWR that includes waiting users of a contact center queue. That is, the user device is connected to a VWR that includes the respective devices of the waiting users. The VWR enables the user to virtually interact with at least a subset of the waiting users. That is, inputs received from the user via the user device can be transmitted by the user device and received by respective devices of the at least the subset of the waiting users, and vice versa. The user can be connected to the VWR using different modes that enable communication with, communication from, or visibility of the user (e.g., presence of the user) to at least some of the other waiting users. As such, the user can be connected to the virtual waiting room in a mode (e.g., public mode) that enables the user to interact with at least a subset of the waiting users. For example, and as described with respect to group-chat window 624 of FIG. 6, the user can interact with all other waiting users using a group chat enabled of the VWR. To be more specific, the user can interact with those waiting users who are not themselves in a private mode or users who have not blocked the user, as described above.

At 906, responsive to an indication to activate a private session between the user device and an agent device associated with a contact center agent, the user is removed from the virtual waiting room. The technique 900 can further include activating the private session between the user and the contact center agent responsive to the request to connect the user device to the private session between the user and the contact center agent. In an example, removing the user from the virtual waiting room can include receiving a request from the user device to keep the user device connected to the virtual waiting room for a period of time, as described with respect to the dialog 700 of FIG. 7. In response to receiving a request from the user device after the period of time to activate the private session, removing the user from the virtual waiting room, as described with respect to the dialog 706 of FIG. 7.

The technique 900 can include receiving a request from the user device to interact with at least one of the waiting users. The request can be to post a message to a group chat, as described with respect to the group-chat window 624 of FIG. 6; or to post a message in a private chat, as described with respect to private-chat window 626 of FIG. 6. The technique 900 can include receiving a request from the user device to initiate a private chat session with at least one of the waiting users, as described with respect to action 614 of FIG. 6.

The technique 900 can include preventing at least a subset of the waiting users from communicating with the user. Waiting users blocked by the user are prevented from communicating with the user. Additionally, if the user is in a private mode, then none of the users can interact with the user. The private mode enables the user to observe communications of at least a subset of the waiting users and hides a presence of the user from the waiting users.

The technique 900 can include enabling a preview mode of at least one of a video channel or an audio channel of the user device, as described with respect to the previewer 602 of FIG. 6. The technique 900 can include receiving from a first waiting user a favorable indication of a second waiting user; and modifying a position of the second waiting user in the contact center queue based on the favorable indication.

Another aspect for connecting a user requesting a contact center agent interaction to a VWR includes receiving a request from a user device associated with the user to initiate a private session between the user and a service provider. The user device is connected to a queue of waiting users of a VWR. At least a first subset of the waiting users is enabled to virtually interact with a second subset of the waiting users. Responsive to receiving a request to activate the private session, the user is removed from the VWR.

Yet another aspect for connecting a user requesting a contact center agent interaction to a VWR includes receiving a request for a contact center agent interaction from a user device associated with the user. The user device of the user is connected to a VWR configuring the user to interact with waiting users in a contact center queue. Responsive to removing the user from the VWR based on an agent becoming available for the contact center agent interaction, the user device is connected to a private session between the user and the agent.

Some implementations may include a method that includes receiving a request for a contact center agent interaction from a user device associated with a user. The user device is connected to a virtual waiting room that includes waiting users of a contact center queue. The virtual waiting room enables the user to virtually interact with at least a subset of the waiting users. Responsive to an indication to activate a private session between the user device and an agent device associated with a contact center agent, the user is removed from the virtual waiting room. In an example, the method can include receiving a request from the user device to interact with at least one of the waiting users. In an example, the method can include preventing at least a subset of the waiting users from communicating with the user. In an example, the user device can be connected to the virtual waiting room in a private mode that enables the user to observe communications of at least a subset of the waiting users and hides a presence of the user from the waiting users. In an example, the method can include receiving a request from the user device to initiate a private chat session with at least one of the waiting users. In an example, the method can include enabling a preview mode of at least one of a video channel or an audio channel of the user device. In an example, the waiting users can include a first waiting user and a second waiting user, and the method can include receiving from the first waiting user a favorable indication of the second waiting user and modifying a position of the second waiting user in the contact center queue based on the favorable indication. In an example, the method can include activating the private session between the user and the contact center agent responsive to the request to connect the user device to the private session between the user and the contact center agent. In an example, removing the user from the virtual waiting room can include receiving a request from the user device to keep the user device connected to the virtual waiting room for a period of time. In response to receiving a request from the user device after the period of time to activate the private session, the user is removed from the virtual waiting room.

Some implementations may include a device that includes a memory and a processor. The processor can be configured to execute instructions stored in the memory to receive a request for a contact center agent interaction from a user device associated with a user. The user device can be connected to a virtual waiting room that includes waiting users of a contact center queue. The virtual waiting room enables the user to virtually interact with at least a subset of the waiting users. Responsive to an indication to activate a private session between the user device and an agent device associated with a contact center agent, the user can be removed from the virtual waiting room. In an example, the user can be connected to the virtual waiting room in a mode that enables the user to interact with at least a subset of the waiting users. In an example, the user can be connected to the virtual waiting room in a mode that hides a presence of the user from the waiting users and enables the user to observe communications of at least some of the waiting users. In an example, the indication to activate the private session between the user device and the agent device can be a request received from the agent device to activate the private session. In an example, the indication to activate the private session between the user device and the agent device can be received in response to the processor executing instructions for determining that the contact center agent is available. In an example, the processor can be configured to execute instructions to transmit a prompt to the user device indicating whether to activate the private session between the user device and the agent device. A response indicating not to activate the private session may be received. The user can be moved down in an order of the waiting users.

Some implementations may include a non-transitory computer readable medium that stores instructions operable to cause one or more processors to perform operations that include receiving a request for a contact center agent interaction from a user device associated with a user. The user device can be connected to a virtual waiting room that includes waiting users of a contact center queue. The virtual waiting room enables the user to virtually interact with at least a subset of the waiting users. Responsive to an indication to activate a private session between the user device and an agent device associated with a contact center agent, the user can be removed from the virtual waiting room. In an example, the operations can include receiving a request from the user device to interact with at least one of the waiting users. In an example, the operations can include connecting the user device to the virtual waiting room in a mode that enables the user to interact with at least a subset of the waiting users. In an example, the operations can include connecting the user device to the virtual waiting room in a private mode that enables the user to observe communications of at least a subset of the waiting users and hides a presence of the user from the waiting users. In an example, the operations can include receiving a request from the user device to keep the user device connected to the virtual waiting room for a period of time. In response to receiving a request from the user device after the period of time to activate the private session, the user can be removed from the virtual waiting room.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   receiving a request for a contact center agent interaction from a user device associated with a first user;
   connecting the user device to a virtual waiting room that includes waiting users of a contact center queue, wherein the waiting users include a second user;
   receiving from the second user a favorable indication of the first user;
   modifying a position of the first user in the contact center queue based on the favorable indication; and
   responsive to an indication to activate a private session between the user device and an agent device associated with a contact center agent, removing the first user from the virtual waiting room.

2. The method of claim 1, wherein the favorable indication is received from the second user in response to a message posted in the virtual waiting room by the first user.

3. The method of claim 1, wherein the position of the first user is modified in response to receiving respective favorable indications from a predefined percent of the waiting users.

4. The method of claim 1, wherein a number of positions to modify the position of the first user in the contact center queue is based on a total number of favorable indications of the first user.

5. The method of claim 1, further comprising:
   receiving a request from the user device to initiate a private chat session with at least one of the waiting users.

6. The method of claim 1, further comprising:
activating the private session between the first user and the contact center agent responsive to the request to connect the user device to the private session between the first user and the contact center agent.

7. The method of claim 1, wherein the indication to activate the private session between the user device and the agent device is received in response to determining that the contact center agent is available.

8. The method of claim 1, further comprising:
moving the first user down in an order of the waiting users in response to receiving an indication to delay a start of the private session.

9. The method of claim 1, further comprising:
connecting the user device to the virtual waiting room in a private mode that enables the first user to observe communications of at least a subset of the waiting users and hides a presence of the first user from the waiting users.

10. A device, comprising:
a memory; and
a processor, the processor configured to execute instructions stored in the memory to:
receive a request for a contact center agent interaction from a user device associated with a first user;
connect the user device to a virtual waiting room that includes waiting users of a contact center queue, wherein the waiting users include a second user;
receive from the second user a favorable indication of the first user;
modify a position of the first user in the contact center queue based on the favorable indication; and
responsive to an indication to activate a private session between the user device and an agent device associated with a contact center agent, remove the first user from the virtual waiting room.

11. The device of claim 10, wherein the favorable indication is received from the second user in response to a message posted in the virtual waiting room by the first user.

12. The device of claim 10, wherein the position of the first user is modified in response to receiving respective favorable indications from a predefined percent of the waiting users.

13. The device of claim 10, wherein a number of positions to modify the position of the first user in the contact center queue is based on a total number of favored indications provided to the first user.

14. The device of claim 10, wherein the indication to activate the private session between the user device and the agent device is received in response to determining that the contact center agent is available.

15. The device of claim 10, wherein the processor is further configured to execute instructions to:
move the first user down in an order of the waiting users in response to receiving an indication to delay a start of the private session.

16. A non-transitory computer readable medium that stores instructions operable to cause one or more processors to perform operations comprising:
receiving a request for a contact center agent interaction from a user device associated with a first user;
connecting the user device to a virtual waiting room that includes waiting users of a contact center queue, wherein the waiting users include a second user;
receiving from the second user a favorable indication of the first user;
modifying a position of the first user in the contact center queue based on the favorable indication; and
responsive to an indication to activate a private session between the user device and an agent device associated with a contact center agent, removing the first user from the virtual waiting room.

17. The non-transitory computer readable medium of claim 16, wherein the favorable indication is received from the second user in response to a message posted in the virtual waiting room by the first user.

18. The non-transitory computer readable medium of claim 16, wherein the position of the first user is modified in response to receiving respective favorable indications from a predefined percent of the waiting users.

19. The non-transitory computer readable medium of claim 16, wherein a number of positions to modify the position of the first user in the contact center queue is based on a total number of favored indications provided to the first user.

20. The non-transitory computer readable medium of claim 16, wherein the virtual waiting room enables the first user to virtually interact with at least a subset of the waiting users.

* * * * *